(12) United States Patent  
Abuelsaad et al.

(10) Patent No.: US 9,568,328 B1  
(45) Date of Patent: Feb. 14, 2017

(54) REFINE ROUTE DESTINATIONS USING TARGETED CROWD SOURCING

(71) Applicant: INTERNATIONAL BUSINESS MACHINES CORPORATION, Armonk, NY (US)

(72) Inventors: Tamer E. Abuelsaad, Somers, NY (US); Gregory J. Boss, Saginaw, MI (US); John E. Moore, Jr., Brownsburg, IN (US); Randy A. Rendahl, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/944,894

(22) Filed: Nov. 18, 2015

(51) Int. Cl.
| | | |
|---|---|---|
| *G01C 21/20* | (2006.01) | |
| *G01C 21/34* | (2006.01) | |
| *H04W 64/00* | (2009.01) | |
| *G06F 19/00* | (2011.01) | |

(52) U.S. Cl.  
CPC .......... *G01C 21/3415* (2013.01); *G01C 21/20* (2013.01); *H04W 64/00* (2013.01)

(58) Field of Classification Search  
CPC .... G01C 21/20; G01C 21/3415; H04W 64/00; G06F 19/00  
USPC ...................... 701/408, 522, 468; 340/955.19  
See application file for complete search history.

(56) References Cited

U.S. PATENT DOCUMENTS

| | | | |
|---|---|---|---|
| 7,711,475 B1 * | 5/2010 | Cona ................... | G01C 21/3415 |
| | | | 340/995.19 |
| 8,938,358 B1 | 1/2015 | Shynar et al. | |
| 2003/0083807 A1 * | 5/2003 | Kuroda ............... | G01C 21/362 |
| | | | 701/468 |
| 2006/0173841 A1 | 8/2006 | Bill | |
| 2015/0330805 A1 * | 11/2015 | Cho ....................... | H04W 4/02 |
| | | | 701/428 |
| 2015/0339923 A1 * | 11/2015 | Konig ................... | G08G 1/202 |
| | | | 701/522 |

\* cited by examiner

*Primary Examiner* — Tan Q Nguyen  
(74) *Attorney, Agent, or Firm* — Cantor Colburn LLP; Kurt Goudy (57) ABSTRACT

Technical solutions are described to for refining a travel route based on crowd sourcing. An example computer-implemented method includes receiving a first location as a travel destination of a first user. The method also includes identifying a set of users that indicated the first location as a travel destination. The method also includes determining a first subset of users from the set of users by comparing a first set of attributes associated with the first user and each user from the set of users. The method also includes determining a second subset of users from the first subset of users by comparing a second set of attributes associated with the first user and each user from the first subset of users. The method also includes identifying a second location to which the users from the second subset diverged to when traveling to the first location. The method also includes in response, selecting the second location as the travel destination of the first user.

20 Claims, 4 Drawing Sheets

REFINE ROUTE DESTINATIONS USING TARGETED CROWD SOURCING

BACKGROUND

The present application relates to computer technology, and more specifically, to navigation systems.

Typically, a traveler uses a navigation system such as GOOGLE™ MAPS, APPLE™ MAPS, TOM TOM™, GARMIN™ NUVI™, and the like to determine a route to a travel destination, especially when traveling out of town. The traveler, typically, inputs into the navigation system a travel destination, such as an address, a point of interest, a name of a business, or any identifier that the navigation system parses and interprets as the travel destination. For example, the travel destination may be a conference center, a tourist spot, an airport, a car rental facility, a coffee shop, a store, a mall, a park, a beach, or any other geographic location. The navigational system may further receive a source location, such as a current location of the traveler, or any other source location that the traveler may identify. The navigation system, in response, identifies one or more routes from the source location to the travel destination and presents them to the traveler.

SUMMARY

According to an embodiment, a computer implemented method for refining a travel route based on crowd-sourcing includes receiving a first location as a travel destination of a first user. The method also includes identifying a set of users that indicated the first location as a travel destination. The method also includes determining a first subset of users from the set of users by comparing a first set of attributes associated with the first user and each user from the set of users. The computer implemented method also includes determining a second subset of users from the first subset of users by comparing a second set of attributes associated with the first user and each user from the first subset of users. The computer implemented method also includes identifying a second location to which the users from the second subset diverged to when traveling to the first location. The computer implemented method also includes in response, selecting the second location as the travel destination of the first user.

According to another embodiment, a system for refining a travel route based on crowd-sourcing includes a memory, and a processor. The processor receives a first location as a travel destination of a first user. The processor also identifies a set of users scheduled to travel to the first location; determine a first subset of users from the set of users by comparing a first set of attributes associated with the first user and each user from the set of users. The processor also determines a second subset of users from the first subset of users based on a comparison of a second set of attributes associated with the first user and each user from the first subset of users. The processor also identifies a second location to which the users from the second subset diverged to when traveling to the first location. The processor also, in response, selects the second location as the travel destination of the first user.

According to another embodiment, a computer program product for refining a travel route based on crowd sourcing includes computer readable storage medium. The computer readable storage medium includes computer executable instructions to receive a first location as a travel destination of a first user. The computer readable storage medium also includes computer executable instructions to identify a set of users scheduled to travel to the first location. The computer readable storage medium also includes computer executable instructions to determine a first subset of users from the set of users by comparing a first set of attributes associated with the first user and each user from the set of users. The computer readable storage medium also includes computer executable instructions to determine a second subset of users from the first subset of users based on a comparison of a second set of attributes associated with the first user and each user from the first subset of users. The computer readable storage medium also includes computer executable instructions to identify a second location to which the users from the second subset diverged to when traveling to the first location. The computer readable storage medium also includes computer executable instructions to, in response, select the second location as the travel destination of the first user, where the second location is within a predetermined vicinity of the first location.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed herein are technical solutions for refining a route to a travel destination input by a traveler. The refinement is based on identifying a different travel destination and rerouting the traveler to the different destination. For example, when indicating an airport as the travel destination, a typical navigation system provides directions to an arrival or a destination drop off at the airport. The traveler may have a rental car and hence may be searching for a car rental facility (which is typically off the airport). Alternatively, the typical navigation system presents directions to an official mailing address of the travel destination input, which may not be a drivable location. For example, the official address of the airport may be a location of an administrative building, or a control tower or the like, which may be on a side of the airport closed to travelers. In another example, the typical navigation system may direct the traveler going to a conference at a convention center to a main entrance of the conference center; however, parking garage with direct access to the convention center may be on a different side than the main entrance.

The solutions described herein use crowd sourced information to assist in finding an optimized location as a destination for route navigation. For example, getting location of the rental car return facility, not the airport; or finding parking not just the main entrance to a venue. The examples described select a specific subset of a crowd-sourced group of travelers based on similar attributes to the traveler and further weigh the subset based on situational criteria that is similar to the traveler.

Figure 1:
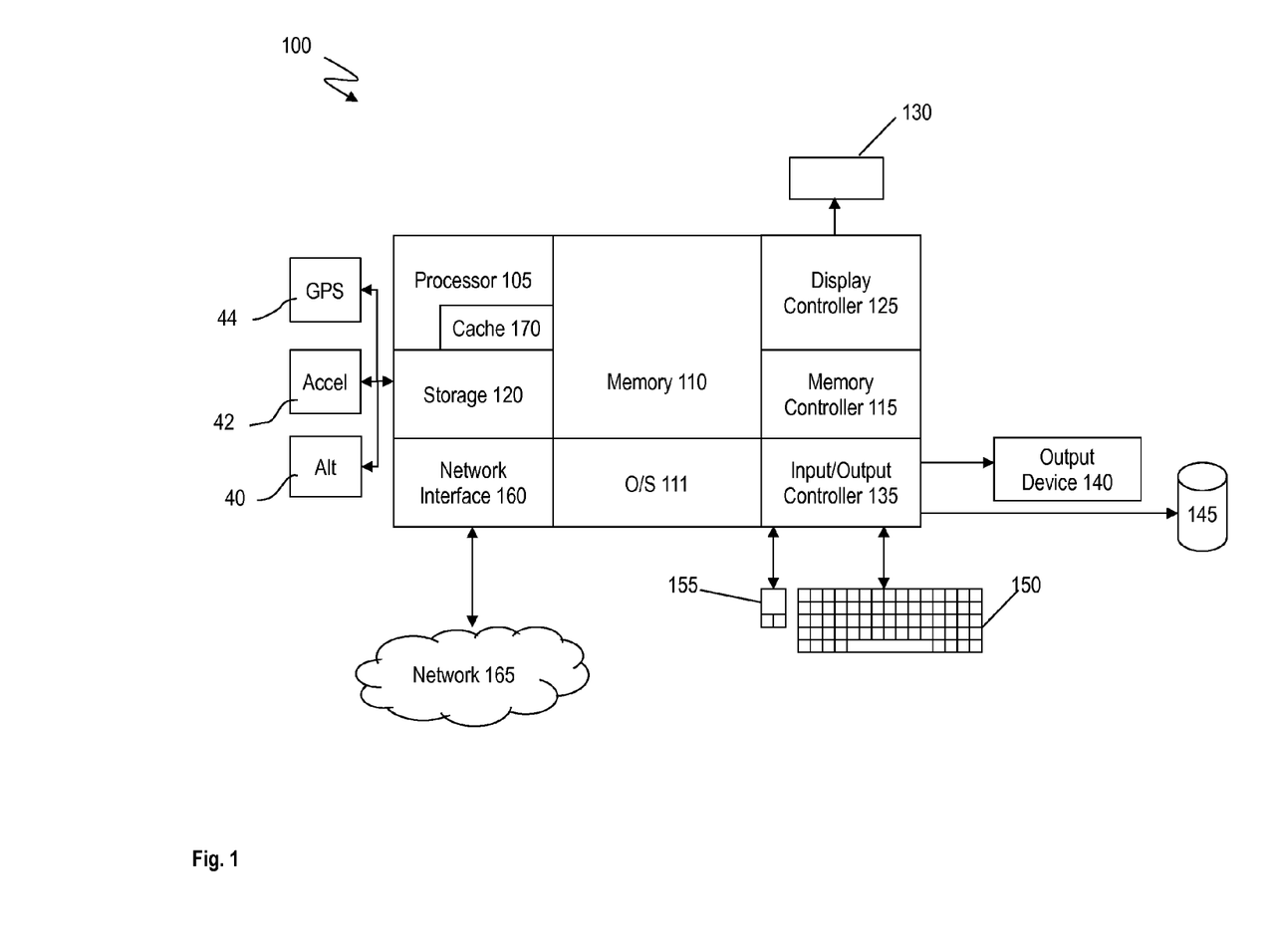
FIG. 1 illustrates an example system determining a route to a destination in accordance with an embodiment.

FIG. 1 illustrates a navigation system 100 that implements the technical solutions described herein. The navigation system 100 may be a communication apparatus, such as a computer. For example, the system 100 may be a desktop computer, a tablet computer, a laptop computer, a phone, such as a smartphone, a server computer, or any other device that communicates via the network 165. The system 100 includes hardware, such as electronic circuitry.

The system 100 includes, among other components, a processor 105, memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors (altimeter 40, accelerometer 42, Global Positioning System sensor 44), indicator/ identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/ demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

Figure 2:
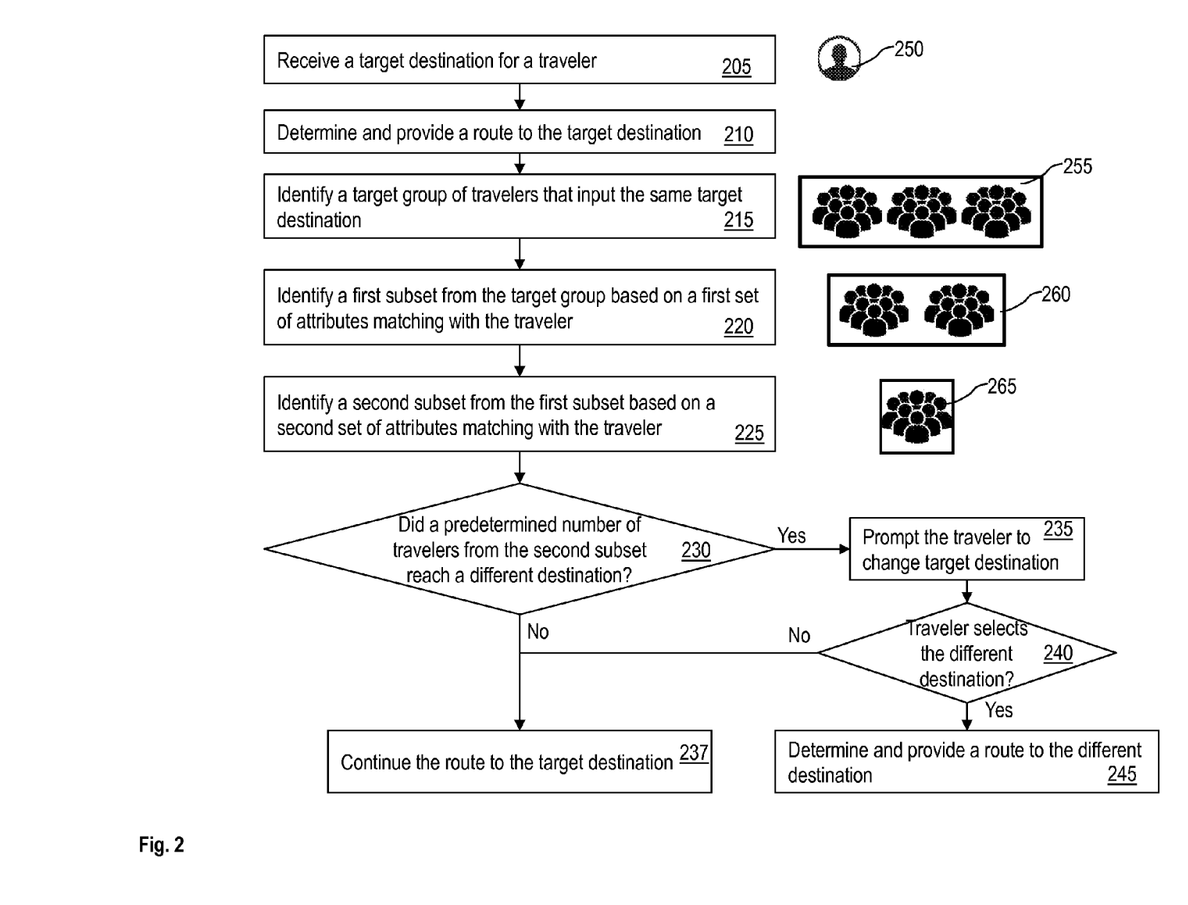
FIG. 2 illustrates a flowchart of example logic for determining a replacement target destination based on crowd-sourced information in accordance with an embodiment.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The system 100 may further include a display controller 125 coupled to a user interface or display 130. In some embodiments, the display 130 may be an LCD screen. In other embodiments, the display 130 may include a plurality of LED status lights. In some embodiments, the system 100 may further include a network interface 160 for coupling to a network 165. The network 165 may be an IP-based network for communication between the system 100 and an external server, client and the like via a broadband connection. In an embodiment, the network 165 may be a satellite network. The network 165 transmits and receives data between the system 100 and external systems. In some embodiments, the network 165 may be a managed IP network administered by a service provider. The network 165 may be implemented in a wireless fashion, for example, using wireless protocols and technologies, such as Wi-Fi, WiMAX, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

FIG. 2 illustrates a flowchart of example logic for refining a route for a traveler 250. In an example, the system 100 implements the method illustrated. The system 100 receives a target destination for the traveler, as shown at block 205. For example, the traveler 250 inputs the target destination, such as an address, a name of a landmark, a name of a hotel, a conference center, a tourist spot, a business, a store, or any other identifier of the target destination. Alternatively or in addition, the system 100 receives the target destination by accessing an entry in a smartphone, a personal digital assistant, an inbox, a calendar, or any other apparatus of the traveler 250. The entry may identify the traveler's scheduled visit to the target destination. For example, the entry may be a calendar meeting entry, a to-do list entry or the like or a combination thereof. The system 100 determines and presents one or more routes for the traveler 250 to follow to reach the target destination, as shown at block 210. For example, the system 100 determines the route using information such as from the GPS sensor 44 and the network 165. For example, the system 100 may access a map database, a traffic database, and other such data repositories via the network 165 to identify the one or more routes.

The system 100 further identifies a target group 255 of travelers who are travelling to the same target destination as the traveler 250, as shown at block 215. For example, the travelers in the target group 255 may be scheduled to arrive or have recently arrived at the same target destination. In an example, the system 100 identifies the target group 255 based on a scheduled attendance to an event, such as a flight, a conference, a meeting, or any other such event. The system 100 may identify the scheduled attendance based on the travelers inputting the target destination into the system 100. Alternatively or in addition, the system 100 identifies the scheduled attendance based on respective entries, such as in a smartphone or the like, by the respective travelers in the target group 255. In addition, another example system 100 identifies the scheduled attendance based on historical attendance to the event by a traveler in the target group 255. In yet another example, the system 100 may select travelers as part of the target group 255 based on their respective home city, that is where they live, and other factors that may affect use of specific facilities such as rental cars, parking discounts, or other such factors.

Figure 3:
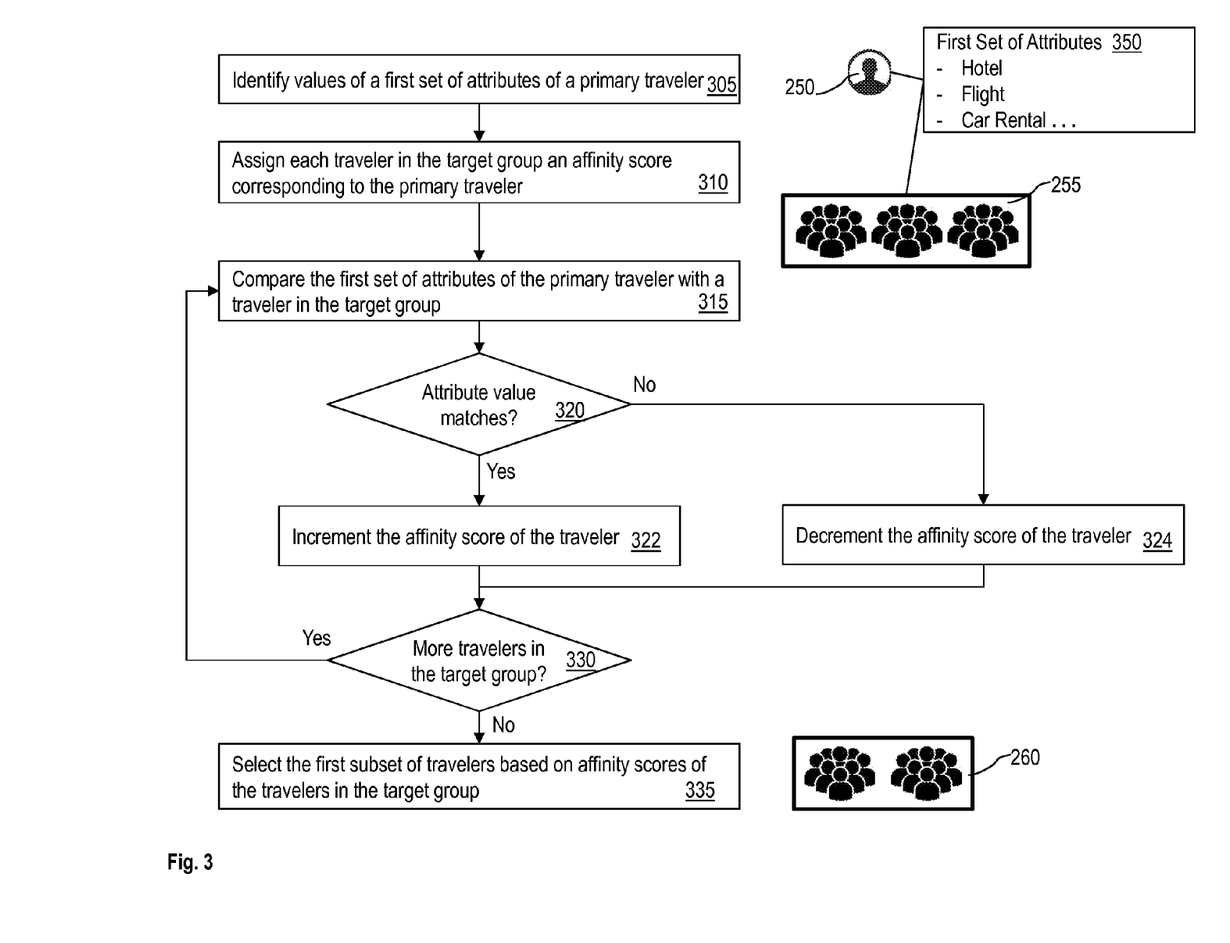
FIG. 3 illustrates a flowchart of example logic for identifying a subset of travelers in accordance with an embodiment.

The system 100 further identifies a first subset 260 from the target group 255 based on a first set of attributes matching with the traveler 250, as shown at block 220. FIG. 3 illustrates a flowchart of identifying the first subset 260 from the target group 255. The traveler 250 is referred to as the 'primary traveler' in the flowchart. The system 100 identifies values of a first set of attributes 350 of the traveler 250, as shown at block 305. The first set of attributes 350 may include a hotel that the traveler 250 stayed at, a car rental company that the traveler 250 used, an airline company the traveler 250 used, or any other such attribute regarding the trip to the target destination. In an example, the system 100 identifies the values of the attributes by scanning a smartphone, a personal digital assistant, a calendar, an inbox, or other information of the traveler 250. In an example, the system 100 accesses the information for the attributes from a remote server such as an EXCHANGE SERVER™, a LOTUS DOMINO SERVER™, or any other data repository.

In a similar manner, the system 100 identifies values of the first set of attributes 350 for each of the travelers in the target group 255. The system 100 assigns each traveler in the target group 255, an affinity score corresponding to the traveler 250, as shown at block 310. Affinity may be based on characteristics that a person shares with a group (for example, stayed at same hotel, used same car rental company and so on). The number of common characteristics and the affinity score are positively correlated, thus the larger the number of common characteristics the higher the affinity score will be. Thus, a traveler in the first subset 260 has a higher positive affinity with the traveler 250 than a traveler that is in the target group 255 and not in the first subset 260.

In an example, the affinity score may be set to a predetermined value, such as zero, ten, hundred, or any other predetermined value. The system 100 compares the values of the first set of attributes 350 associated with the traveler 250 with those of the travelers of the target group 255, as shown at block 315. If an attribute value of the traveler 250 matches with that of a traveler from the target group 255, the system 100 increments the affinity score for the traveler, as shown at blocks 320 and 322. Else, if the attribute value does not match, the system 100 decrements the affinity score, as shown at block 324. In an example, the system 100 may not decrement, rather keep the affinity score as is in case of the mismatch. The affinity score may be incremented and decremented by a predetermined value, such as one, two, five, ten, or any other predetermined value. In an example, each attribute may have a corresponding increment or decrement value that the system 100 uses in case that attribute matches or mismatches. In yet another example, the system 100 increments, or decrements the affinity score based on a weighting factor. For example, the car rental company may be weighted two times that of the airline company. Accordingly, in case the car rental company matches, the affinity score is incremented by twice that in case the airline company matches. In another case, the system 100 increments or decrements the affinity score based on a weighting factor associated with the traveler from the target group 255. For example, a first traveler from the same home city as the traveler 250 may be weighted twice that of a second traveler from a different home city. Accordingly, a matching attribute of the first traveler increments the affinity score of the first traveler twice that of the matching attribute of the second traveler.

The system 100 updates the affinity score assigned to each traveler in the target group 255, as shown at blocks 330. Based on the affinity scores, the system 100 narrows the target group 255 and identifies the first subset 260 that includes travelers with higher affinity with the traveler 250, as shown at block 335. In an example, travelers with an affinity score above a predetermined threshold are selected in the first subset 260. Alternatively or in addition, the travelers from the target group 255 are selected into the first subset 260 based on a relative affinity score, such as top 20%, top 10% or the like.

Figure 4:
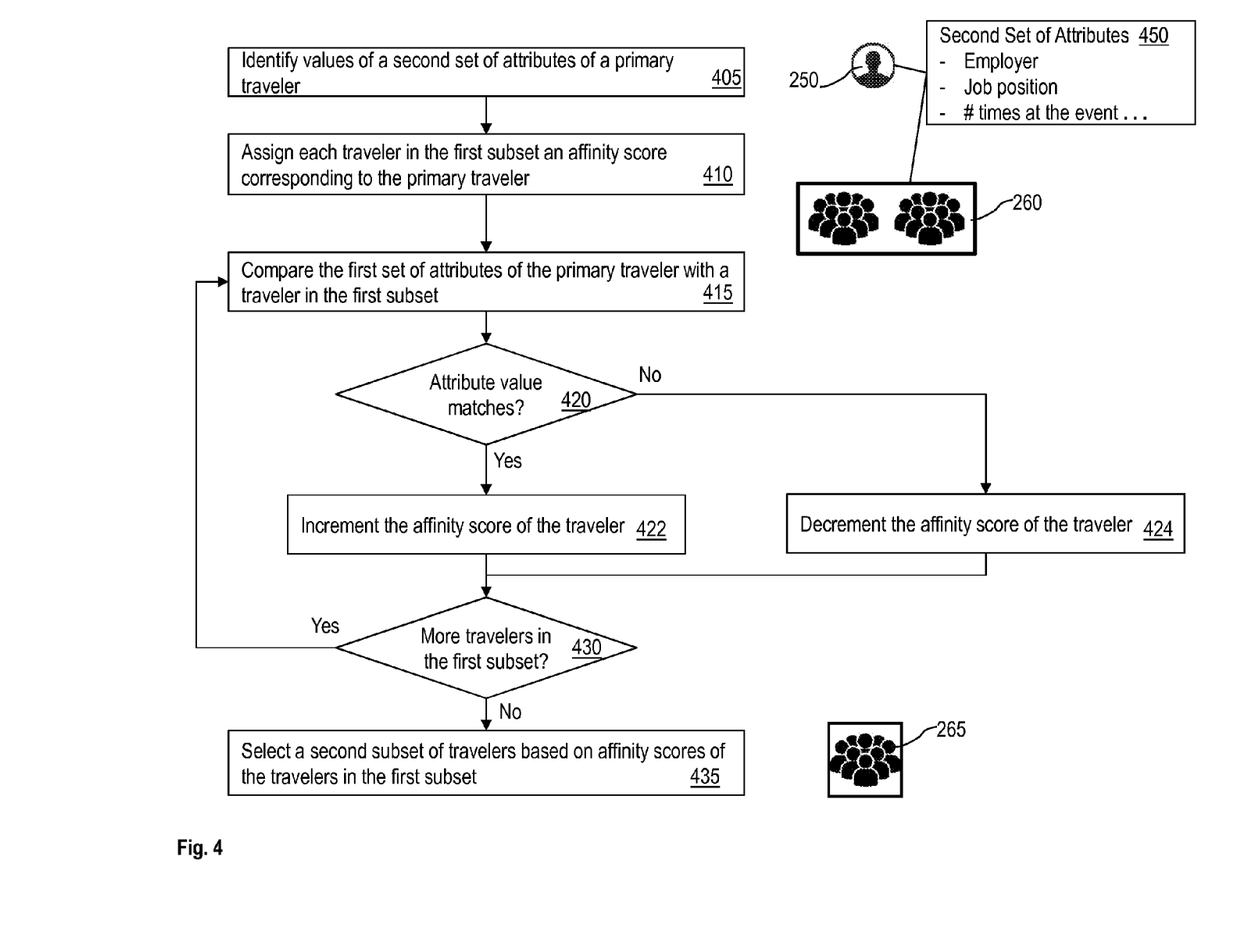
FIG. 4 illustrates a flowchart of example logic for identifying a subset of travelers in accordance with an embodiment.

Referring back to FIG. 2, the system 100 further identifies a second subset 265 from the first subset 260 based on a second set of attributes matching with the traveler 250, as shown at block 225. FIG. 4 illustrates a flowchart of identifying the second subset 265 from the first subset 260. Again, the traveler 250 is referred to as the 'primary traveler' in the flowchart. The system 100 identifies values of a second set of attributes 450 of the traveler 250, as shown at block 405. The second set of attributes 450 may include situational criteria such as an employer, an organization or club membership, a country of citizenship, a country of residence, a job position title, a number of years of experience at the current position, a number of times traveled to the target destination, a list of social network groups, and other attributes to further narrow the first subset 260. The system 100 narrows the first subset 260 by identifying travelers within the first subset 260 that have higher affinities with the traveler 250 regarding the target destination, based on the second set of attributes 450. In an example, the system 100 identifies the values of the attributes by scanning a smartphone, a personal digital assistant, a calendar, an inbox, or other information of the traveler 250. In an example, the system 100 accesses the information for the attributes from a remote server such as an EXCHANGE SERVER™, a LOTUS DOMINO SERVER™, or any other data repository.

In a similar manner, the system 100 identifies values of the second set of attributes 450 for each of the traveler in the first subset 260. The system 100 assigns each traveler in the first subset 260, an affinity score corresponding to the traveler 250, as shown at block 410. In an example, the affinity score assigned is a second affinity score, which is distinct from a first affinity score assigned when determining the first subset 260. Alternatively, the affinity score assigned is the same affinity score that was computer when determining the first subset 260. If a distinct second affinity score is assigned, the system sets the second affinity score to a predetermined value, such as zero, ten, hundred, or any other predetermined value. In the example described further, the system 100 is assumed to use the same affinity score that was assigned during selection of the first subset 260, as described herein, however it will be obvious to a person skilled in the art that the second affinity score can be used in a similar manner.

The system 100 compares the values of the second set of attributes 450 associated with the traveler 250 with those of the travelers of the first subset 260, as shown at block 415. If an attribute value of the traveler 250 matches with that of a traveler from the first subset 260, the system 100 increments the affinity score for the traveler, as shown at blocks 420 and 422. Else, if the attribute value does not match, the system 100 decrements the affinity score, as shown at block 424. In an example, the system 100 may not decrement, rather keep the affinity score as is in case of the mismatch. The affinity score may be incremented and decremented by a predetermined value, such as one, two, five, ten, or any other predetermined value. In an example, each attribute may have a corresponding increment or decrement value that the system 100 uses in case that attribute matches or mismatches. In yet another example, the system 100 increments, or decrements the affinity score based on a weighting factor. For example, the employer attribute may be weighted two times that of the job position title. Accordingly, in case the employer matches, the affinity score is incremented by twice that in case the job position title matches. In another case, the system 100 increments or decrements the affinity score based on a weighting factor associated with the traveler from the first subset 260. For example, a first traveler who shares membership of an organization with the traveler 250, may be weighted twice that of a second traveler who does not. Accordingly, a matching attribute of the first traveler increments the affinity score of the first traveler twice that of the matching attribute of the second traveler.

In addition to positive affinity impacts, there can be factors that reduce affinity. For example, people that live locally versus people traveling from out of town. Affinity of local people for a group being created around travelers may be reduced. Those members with extra affinity are given higher weights than other members and then the weights are applied to determine which destination/location is the optimal destination for the traveler 250.

The system 100 updates the affinity score assigned to each traveler in the first subset 260, as shown at blocks 430. Based on the affinity scores, the system 100 narrows the first subset 260 and identifies the second subset 265 that includes travelers with higher affinity with the traveler 250, as shown at block 435. In an example, travelers with an affinity score above a predetermined threshold are selected in the second subset 265. Alternatively or in addition, the travelers from the first subset 260 are selected into the second subset 265 based on a relative affinity score, such as top 20%, top 10% or the like.

In an example, the system 100 displays the affinity scores corresponding to each traveler in the target group 255. Alternatively, affinity scores of only the travelers in the first subset 260 and/or the second subset 265 are displayed.

Referring back to FIG. 2, the system 100 detects divergences from the provided route to the same target destination by travelers of the second subset 265, as shown at block 230. In another example, the system 100 further tracks divergence of the travelers in the first subset 260. For example, the system 100 may monitor the position of a traveler in the second subset 265 to detect when the traveler navigates away from the prescribed route. Alternatively or in addition, the system 100 monitors that the traveler from the second subset 265 stopped at a different location in a vicinity of the target destination. For example, the system 100 detects a lack of motion by the traveler for at least a predetermined duration to conclude that the traveler stopped. Further, the vicinity of the target destination may be geographic region within a predetermined distance, such as two miles, five miles, or any other predetermined distance from the target destination. In an example, the system 100 access a smartphone, a digital assistant, or other applications (such as GOOGLE NOW™, SIRI™, and so on) to access the information of the traveler. Alternatively, the system 100 accesses the smartphone, the digital assistant, or other applications of the traveler 250 to populate the different destination that the travelers from the second subset 265 deviated to in response to the traveler 250 entering the target destination into the smartphone, the digital assistant, or other applications.

In an example, the system 100 detects if a predetermined number of travelers from the second subset 265 deviated from the target destination. The predetermined number of travelers may be one, two, ten, or any other number. Alternatively or in addition, the predetermined number of travelers may be based on a total number of travelers in the second subset 265. For example, the predetermined number of travelers may be 50%, or 60%, or 25%, or any other fraction of the total number of travelers in the second subset 265. If the system 100 detects that the predetermined number of travelers from the second subset 265 deviated to a different location, the system 100 prompts the traveler 250 and identifies the different location as a suggested replacement target destination, as shown at blocks 230 and 235. Else, the system 100 continues to navigate the traveler 250 to the target destination according to the route presented earlier, as shown at block 237. In response to the prompt, the traveler 250 may select the different location as the replacement target destination, in which case the system 100 reroutes the traveler 250 to the different location, as shown at blocks 240 and 245. Else, if the traveler 250 selects to proceed to the target destination originally received, the system 100 continues according to the earlier route, as shown at block 235.

Consider an example scenario in which a traveler T is arriving at a convention or a meeting location. As described herein, the target address provided maybe for an entrance, such as a front entrance of a convention center, a hotel, an office building, or any other location. However, T seeks a parking spot prior to proceeding on foot to the meeting place. In this case, tracking end locations of other participants of the meeting, such as be utilizing anonymized parking locator information, identifies the different location to which the other participants deviated. The system 100 in this case may prompt the traveler T with one or more alternative address suggestions as replacement destinations. T may or may not select to reroute to one of the alternative addresses.

Consider another example scenario, in which the traveler T is returning from the meeting. In this example, the system 100 may identify that ten travelers scheduled to fly on the same flight as traveler T and using the same car rental company R as T, left 20 minutes earlier, and that all of them were being rerouted to car rental company N location. The system 100, based on the examples described herein, logs a deviation from a target crowd corresponding to T, and prompts T regarding the deviation. T may or may not select to reroute to the alternative addresses. In an example, the system 100 identifies the attributes of the travelers that deviated to the different location. Accordingly, the traveler T may decide whether to select the deviated destination based on the attributes.

Consider another example scenario in which the traveler T is at the end of a business trip and is checking out of a hotel on his way to the airport in a rental car from company H. The traveler T, or a digital assistant of T, such as a smartphone digital assistant or any other digital assistant, pre-populates a route to a target destination, in this case the airport, using a published address of the airport. Consider that the prepopulated route would take T to a departure terminal of the airport at least a predetermined time, such as 90 minutes before flight departure. However, unknown to T and/or the digital assistant, the airport has longer than normal lines for the past two weeks due to construction in a rental car return area at the airport. In this case, T and/or the digital assistant, using the technical solutions described herein, queries other travelers who are on the same flight and who also have rental cars to return. The system 100 identifies that the target group 255 is leaving earlier, for example, 20 minutes earlier, and further that a subset, with rental cars from H are traveling to an off campus location to return the rental cars. The system 100 accordingly adjusts the suggested time by 20 minutes to account for the crowd sourced information and modifies the route destination to the off-campus return location that the subset of the target crowd on the same flight are using. Thus, the system facilitates T to arrive for the flight in time. The crowd-sourced information used is from the crowd from the same flight in addition to people who rented cars from the same company as T. In other words, the crowd-sourced information used is from travelers with relatively high affinity with T.

In yet another example scenario, T is traveling to the airport in a rental car from H, the system 100 queries the destinations of other travelers on that same flight (target group) who also have rental cars from H (first subset). The system 100 further queries the route that the identified travelers took to the airport. The system 100 further assigns weighted affinity scores to each traveler according to a criterion (second set of attributes). For example, a traveler who travels to or from that destination (in this case the airport) often (such as business traveler) is assigned a higher weight than a first time traveler (for example, a tourist) is. The system 100 may also assign a higher weight to travelers with similar situational criteria as T, for example travelers who work for the same company as T. The system 100 uses the weighted affinity scores of the users to identify a subset (second subset) and monitors any deviation in their travel to the airport.

In yet another example scenario, consider that T works for employer E, and that T is in Austin and currently returning to the airport. But in this case, T is on vacation, and not a work related trip. T's itinerary indicates that T is to return a rental car to rental company D at the airport instead of a typical business rental company H. In this case, system 100 does not group T with other employees of E who are traveling as part of a work related trip. The system 100 thus recognizes that T has different situational attributes (on vacation versus business trip) compared to other employees of E.

Thus, technical solutions are described herein to detect travel divergences from a majority of people by a selected sub-crowd identified based on an affinity of the people with a user. Based on a selected target destination, the user may be provided navigation directions to the target destination. The sub-crowd with similar travel attributes, and a relatively high affinity with the user is monitored to detect a deviation from the target destination. For example, the sub-crowd members are monitored to see if in the (recent) past or currently a predetermined number of members of the sub-crowd headed to a destination that is different from the target destination. If at least the predetermined number of members of the sub-crowd is arriving at a different location then a deviation is detected and the user is informed accordingly. A choice to change the destination based on the sub-crowd is displayed to the user. In an example, affinity scores of the sub-crowd are also displayed. Based on a selection by the user, the user is either rerouted to the different location or provided navigation directions to the originally selected target destination. The technical solutions, thus, predict the replacement destination for the traveler using crowd-sourced information, without asking the traveler to input specific replacement target destination, or by asking the traveler to input a target destination. In other words, in response to the traveler inputting a target destination, the technical solutions identify a replacement target destination for the traveler. The replacement target destination is based on attributes of the traveler and crowd-sourced attribute information, and not based on a travel history of the traveler.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for refining a travel route based on crowd-sourcing, the method comprising:
   receiving a first location as a travel destination of a first user;
   identifying a set of users that indicated the first location as a travel destination;
   determining a first subset of users from the set of users by comparing a first set of attributes associated with the first user and each user from the set of users;
   determining a second subset of users from the first subset of users by comparing a second set of attributes associated with the first user and each user from the first subset of users; and
   identifying a second location to which the users from the second subset diverged to when traveling to the first location; and
   in response, selecting the second location as the travel destination of the first user.

2. The computer implemented method of claim 1, wherein the first set of attributes comprises identifications of a hotel, a car rental company, an airline company.

3. The computer implemented method of claim 1, wherein the second set of attributes comprises information about an employer and a job position title.

4. The computer implemented method of claim 3, wherein the second set of attributes further comprises a club membership and a number of visits to the first location.

5. The computer implemented method of claim 1 further comprising:
   assigning each user from the set of users an affinity score corresponding to the first user; and
   incrementing the affinity score in response to a matching attribute associated with each user and the first user.

6. The computer implemented method of claim 5, wherein the affinity score is incremented by a weighted score assigned to the matching attribute.

7. The computer implemented method of claim 5 further comprising, decrementing the affinity score in response to a mismatching attribute associated with each user and the first user.

8. The computer implemented method of claim 5, wherein the first subset and the second subset of users is determined based on the affinity score of each user from the set of users.

9. The computer implemented method of claim 1, wherein the second location is a parking place within a predetermined distance from the first location.

10. A system for refining a travel route based on crowd-sourcing, the system comprising:
a memory; and
a processor configured to:
receive a first location as a travel destination of a first user;
identify a set of users scheduled to travel to the first location;
determine a first subset of users from the set of users by comparing a first set of attributes associated with the first user and each user from the set of users;
determine a second subset of users from the first subset of users based on a comparison of a second set of attributes associated with the first user and each user from the first subset of users; and
identify a second location to which the users from the second subset diverged to when traveling to the first location; and
in response, select the second location as the travel destination of the first user.

11. The system of claim 10, wherein the first set of attributes comprises identifications of a hotel, a car rental company, an airline company.

12. The system of claim 10, wherein the second set of attributes comprises information about an employer and a job position title.

13. The system of claim 10, wherein the second location is within a predetermined vicinity of the first location.

14. The system of claim 10, wherein the processor is further configured to:
assign each user from the set of users an affinity score corresponding to the first user; and
increment the affinity score in response to a matching attribute associated with each user and the first user.

15. The system of claim 14, wherein the processor is further configured to decrement the affinity score in response to a mismatching attribute associated with each user and the first user.

16. The system of claim 14, wherein the first subset and the second subset of users is determined based on the affinity score of each user from the set of users.

17. A computer program product for refining a travel route based on crowd-sourcing, the computer product comprising computer readable storage medium, the computer readable storage medium comprising computer executable instructions, wherein the computer readable storage medium comprises instructions to:
receive a first location as a travel destination of a first user;
identify a set of users scheduled to travel to the first location;
determine a first subset of users from the set of users by comparing a first set of attributes associated with the first user and each user from the set of users;
determine a second subset of users from the first subset of users based on a comparison of a second set of attributes associated with the first user and each user from the first subset of users; and
identify a second location to which the users from the second subset diverged to when traveling to the first location; and
in response, select the second location as the travel destination of the first user, wherein the second location is within a predetermined vicinity of the first location.

18. The computer program product of claim 17, wherein the first set of attributes comprises identifications of a hotel, a car rental company, an airline company.

19. The computer program product of claim 17, wherein the second set of attributes comprises information about an employer and a job position title.

20. The computer program product of claim 17, wherein the computer readable storage medium further comprises instructions to:
assign each user from the set of users an affinity score corresponding to the first user;
increment the affinity score in response to a matching attribute associated with each user and the first user; and
decrement the affinity score in response to a mismatching attribute associated with each user and the first user.

* * * * *